Aug. 8, 1944.  E. W. LANDMEIER  2,355,085
FUSE CLAMPING MEANS
Filed Sept. 15, 1941  2 Sheets-Sheet 1
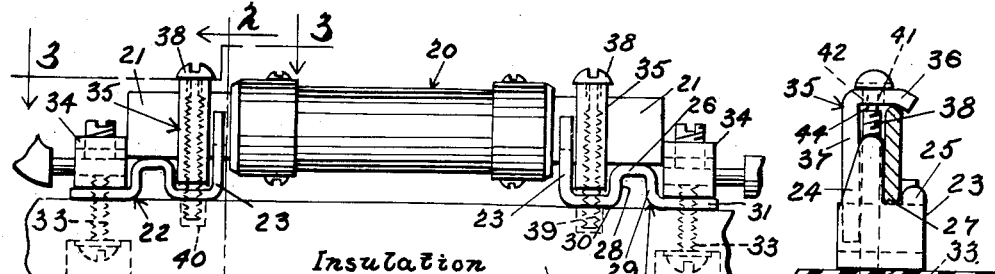
INVENTOR.
Edwin W. Landmeier.
BY
Murray, Sachhoff & Paddach
ATT'YS.

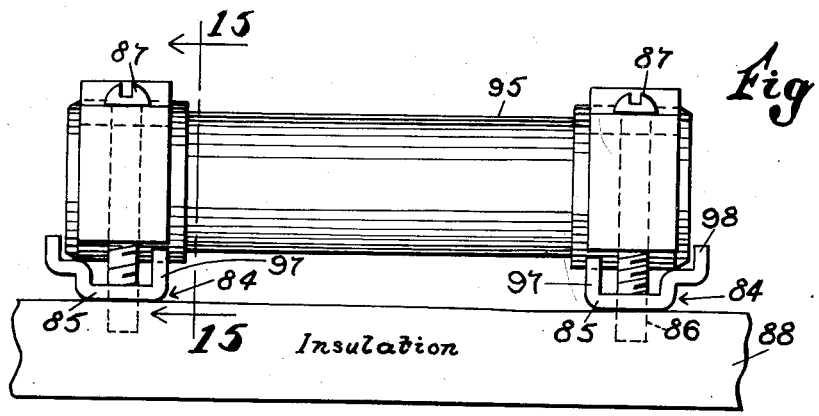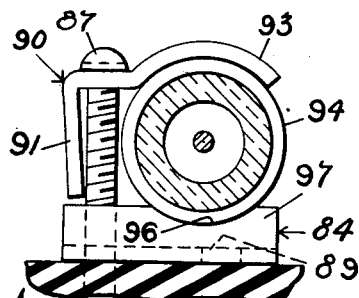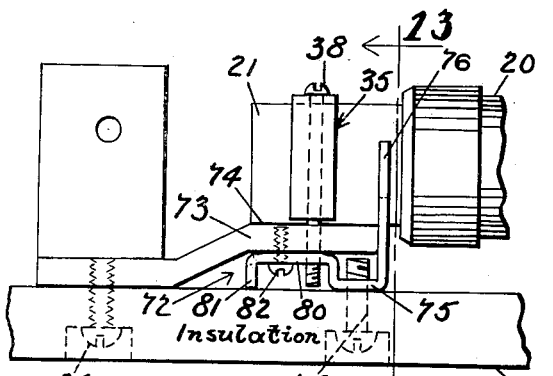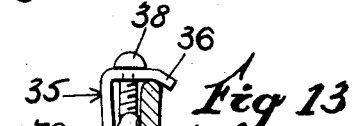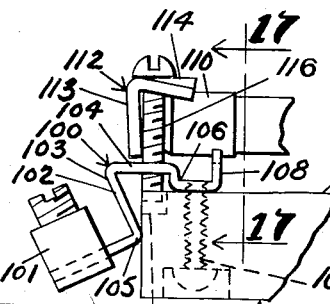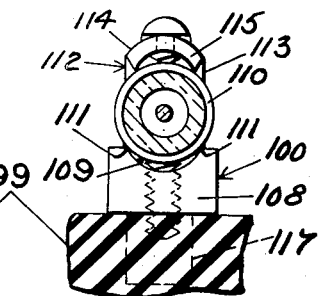

Patented Aug. 8, 1944

2,355,085

UNITED STATES PATENT OFFICE 2,355,085

FUSE CLAMPING MEANS

Edwin W. Landmeier, Covington, Ky., assignor to The Wadsworth Electric Manufacturing Company, Covington, Ky., a corporation of Kentucky Application September 15, 1941, Serial No. 410,809

18 Claims. (Cl. 200—134)

The present invention relates to fuse clamping means and has for an object the provision of simplified and efficient mounting of cartridge type fuses.

Another object of the invention is to provide means to establish between the fuse terminal member and the conductor member of the clamp a narrow linear area of uniform heavy positive pressure contact to avoid power loss and reduce heating of the parts.

A further object of the invention is to provide means for the purposes stated that are fabricated from metal stampings, at least part of which may be of steel.

Still another object of the invention is to provide means that materially simplifies the mounting of the fuse clamp and the associated cable connector.

These and other desirable objects are attained by the means described herein and exemplified in the accompanying drawings, in which:

Fig. 1 is a side elevational view of a cartridge type fuse supported on an insulating base by fuse clamps of the invention embodying cable connectors.

Fig. 2 is a cross-sectional view taken on line 2—2 of Fig. 1.

Fig. 3 is a view taken on line 3—3 of Fig. 1.

Fig. 4 is a side elevational view of a simplified form of fuse clamp of the invention with the terminal end of a fuse mounted therein.

Fig. 5 is a cross-sectional view taken on line 5—5 of Fig. 4.

Fig. 6 is a fragmental side elevational view of a fuse mounted on an insulating base by a modified form of fuse clamp of the invention embodying a solderless cable connector.

Fig. 7 is a view taken on line 7—7 of Fig. 6.

Fig. 8 is a fragmental side elevational view of a fuse mounted on an insulating base by another modified form of fuse clamp of the invention in association with a known solderless cable connector.

Fig. 9 is a view taken on line 9—9 of Fig. 8.

Fig. 10 is a fragmental side elevational view of a fuse mounted on an insulating base with a still further modification of the fuse clamp of the invention with a known type of solderless connector supporting the fuse clamp.

Fig. 11 is a cross-sectional view taken on line 11—11 of Fig. 10.

Fig. 12 is a fragmental side elevational view of a fuse and a known type of solderless connector operatively associated on an insulating base by an all-steel embodiment of the fuse clamp of the invention.

Fig. 13 is a view taken on line 13—13 of Fig. 12.

Fig. 14 is a side elevational view of a ferrule type cartridge fuse mounted on an insulating base by means of another embodiment of the fuse clamps of the invention.

Fig. 15 is a view taken on line 15—15 of Fig. 14.

Fig. 16 is a fragmental side elevational view showing another modified form of fuse clamp.

Fig. 17 is a view taken on line 17—17 of Fig. 16.

Fig. 18 is a fragmental side elevational view showing a modified form of clamp hook.

The clamping of protective fuse terminals under positive mechanical pressure has been proposed for the purpose of avoiding power loss, heating and accompanying disadvantages which occur when the fuses are mounted in resilient fuse clips and the fuse jaws. The fuse clamping devices heretofore known and proposed have endeavored to establish pressure contact between a surface of the fuse terminal and a surface of the copper or other member of high electrical conductivity which forms part of the fuse clamp. Such devices are expensive because they are constructed with relatively large cast metal parts and require machining operations. They have the inherent disadvantages of lower conductivity of the casting alloy compared to drawn copper and of non-uniformity of surface contact with the fuse terminal if the parts are bent or develop an uneven surface, as is very frequently the case.

The present invention avoids the disadvantage of high cost and non-uniform pressure contact by utilizing elements formed less expensively from stampings and by so arranging them with relation to the fuse terminal in use that uniform positive pressure contact is established between an edge of the fuse terminal and a surface of the fuse clamping means or vice versa. This, in effect, provides a relatively thin uniform line of pressure contact between the parts through which current passes with greater efficiency. Furthermore, practically all surfaces of the cooperating contacting elements which are not under uniform pressure are exposed for ready dissipation of the reduced amount of heat produced. The increased efficiency is indicated in tests showing temperatures at the critical points which are several degrees lower than in other known structures under similar load conditions.

Several embodiments of the invention are illustrated, showing its adaptability to a variety of conditions using cartridge fuses with terminals of blade type and ferrule type and with cable connectors associated or integral therewith in order to obviate the necessity for a separate base conductor piece in order to operatively mount the parts on an insulating base. The embodiments shown are by way of example and the invention is not to be considered as restricted to the specific examples since it will be apparent to those skilled in the art to vary the manner of mounting of the fuse clamping means to suit the particular work at hand.

The device consists essentially of a body arranged to position the fuse terminal to be clamped and a clamp for the terminal connected to the body by a screw whereby a narrow line or strip of uniform positive pressure contact is established between the current conducting parts and with no mutual contact between the respective extended sidewall surfaces of said parts. The said connection is referred to hereinafter as pressure line contact as distinguished from the comparatively non-uniform contacts that are attainable under practical conditions by bringing together two relatively extended surfaces under pressure. The body portion of the device is in most embodiments formed of stampings of copper or other metal of high conductivity and affords the seating edge or the seating surface against which a surface or an edge of the fuse terminal is disposed under pressure line contact. The clamp may be of any material of suitable strength such as a steel stamping and the binding screw may be an inexpensive iron screw. In Figs. 12 and 13 I have illustrated a modified form of the device wherein both the body and the clamp are formed of steel stampings arranged to receive the lug of a copper switch jaw as shown, or the lug of a solderless connector, between them so that the lug forms the seat for the fuse terminal.

Referring now to Fig. 1, 20 indicates a cartridge fuse with blade terminals 21. The body 22 is a copper stamping with an upright end portion 23 slotted to provide a finger 24 and a lug 25 between which the blade 21 is positioned in edgewise relation on an integral contact seat surface 26. The finger 24 and lug 25 are made of unequal height to permit easy introduction and removal of the fuse relative to its position in the clamp after a limited loosening of the clamp hook and clamp screw as will be hereinafter more readily understood. The bottom of the slot 27 is at approximately the level of seat 26. Legs 28 and 29 connect at their tops with seat 26 and said legs have feet 30 and 31 respectively, which rest upon insulating base 32. A screw 33 passes upwardly through the insulating base and is threaded through foot 31 and into a suitable solderless connector 34 which acts as a nut and is precluded from turning by engagement of the edge thereof with the base of leg 29.

A steel clamp 35 has a hook portion 36 and an angularly disposed leg 37. An iron screw 38 passes through the body of the hook 36 and extends along the inside face of leg 37 and then is threadedly passed through the foot 30 of body 22, at 39 and into a recess 40 in the insulating base 32.

With terminal blade 21 positioned as will be understood from an inspection of Fig. 2, the hook 36 may be engaged over the top edge of the blade and pressure applied by tightening screw 38. The requisite heavy pressure for establishing the uniform pressure line contact between the edge of one member and the surface of the other member (e. g., the edge of the blade terminal and the surface of the seat) is easily applied by turning the screw with an ordinary screw driver. In practice, the contacting edge of the blade actually levels off any slight surface irregularities in the seating surface under the applied pressure of the clamp, as indicated by the smooth imprint of the edge of the terminal in the surface of the seat when the fuse is removed.

The several parts of the device may be used in a removably assembled condition, if desired. I prefer to arrange the parts so that the clamp is retained for limited free movement below the head of the screw and also to peen over the end of the screw after passing it through the threaded bore in the body of stamping 22. The parts are thus made inseparable. To retain the clamp, as indicated, the screw 38 has a reduced shank diameter at 41 for a short distance below the head and the bore 42 in the clamp is distorted after the reduced portion 41 is in position. This is accomplished by pressing the metal of the clamp from opposite sides at 43 so that the bore assumes a narrow oval shape which cannot pass the shoulder 44 which may be constituted by the end of the threads. By this arrangement or any other suitable shoulder means beneath the assembled clamp the clamping or releasing of the fuse terminals is facilitated.

The foregoing arrangement may be carried out optionally in part or in its entirety in all of the modified forms of the fuse clamping means, hence repetition is unnecessary in the remaining description and the parts are referred to by like reference numerals throughout.

The strength and effectiveness of the simple clamp is attained in part by disposing the clamping screw so that the terminal may contact and support the screw on one side, while the lower end of the inside face of the clamp presses against the screw shank diametrically opposite. This pressure resists bending strain on the screw shank and also binds it against loosening under vibration without the use of lockwashers.

In Figs. 4, 6, 8 and 10 the stampings of high electrical conductivity, corresponding generally to the previously described body 22, have the seat for the blade of the fuse terminal joining at approximately right angles with the upright finger and lug which position the terminal on the seat. The clamp screw is threaded through the seat closely adjacent the pressure line contact area of the seating surface in these embodiments.

In the specific embodiment of Fig. 4 the body 45 has seat portion 46 with the finger 47 and lug 48 at one end of the seat while the metal at the other end of the seat is turned up and then angularly outward to form a perforated mounting bracket 49.

The device of Fig. 6 has the body 50 with a seat portion 51 with upstanding finger 52 and lug 53 at one end and a downwardly and outwardly turned foot portion 54 to which a solderless connector 55 is permanently secured in suitable fashion, as shown for example in my United States Letters Patent No. 2,173,206, issued September 19, 1939. In this embodiment the insulating base 56 is recessed at 57 to seat the bottom of said connector 55 and the entire device is securely held and retained against turning with a single screw 58 which passes upwardly through the insulating base into said connector 55.

The device of Fig. 8 comprises a stamping 59 with a foot portion 60 adapted to rest on an insulating base 61 and to have a solderless connector 62 seated on top of the said foot portion. A bolt 63, passing up through the insulating base, extends through the said foot and connector and both are tightly secured in position by nut 64. In this embodiment a support sleeve 65 is disposed between the base and the bottom of the contact seat portion 66 and a screw 67 extends upwardly through the base and sleeve and is threadedly engaged in the bottom of contact seat portion 66.

The modification shown in Fig. 10 has the body 67 arranged with the foot 68 resting on the copper cable connector 69, these parts being secured in position on an insulating base 70 by bolt 71 and nut 72. A screw 73 is inserted through foot 68 and into connector 69 to preclude turning of the fuse clamping device about the bolt 71.

In Fig. 12 I have shown a fuse clamping device constructed of steel stampings entirely wherein the body 72 has a modified arrangement whereby the offset lug 73 of a copper switch jaw seats on and is secured on top of body 72 and is positioned to form the contact seat at 74. The body 72 has a U-shaped foot 75 with finger 76 and lug 77 arranged to position the blade terminal 21 of a fuse in an edgewise seating position on seat 74. A screw 78 passes upwardly through insulating base 79 and is threaded into foot 75. A table portion 80 is connected to the top of the U-shaped foot at one end and has a spacing leg 81 at the other end. A small screw 82 holds the parts against turning and a screw 83 binds the switch jaw to the insulating base. The clamp screw 38 functions in the same manner as hereinbefore explained.

In Figs. 14 and 15 I have shown the body and clamp adapted for use on the ferrule type terminal of a cartridge fuse. The copper body 84 has a foot portion 85 with a threaded bore 86 to receive the iron clamping screw 87 which may extend into the insulating base 88. A bore 89 in the foot accommodates another screw (not shown) whereby electrical connection is made with any suitable connector or bus bar (not shown). The steel clamp 90 has a leg 91 which depends alongside an iron clamping screw 87 and contacts the same in the fashion described hereinbefore. The integral hook 93 conforms approximately to the contour of the ferrule terminal 94 of cartridge fuse 95 and presses the surface of said terminal upon the arcuate contact edge 96 of an upstanding lug 97. I provide an end lug 98 to limit the movement of the ferrule and position the latter to secure the desired positive pressure line contact between edge 96 and the surface of the ferrule when the clamping screw 87 is tightened.

The devices illustrated in Figs. 16, 17 and 18 are arranged to clamp the ferrule type terminal of a fuse from the end, instead of from the side as in Figs. 14 and 15. The insulating base 99 is in this instance illustrated as arranged to have the fuse clamp body 100 mounted on the top at the edge thereof with the cable connector 101 of the fuse clamp mounted on an L-shaped tang 102 which connects at an acute angle at 103 with the horizontal portion 104. The right angle bend 105 is arranged to abut the edge of the insulating base 99 and effectively stabilize the body 100 against turning when the U-shaped foot 106 is secured by a single screw 107 which passes upwardly through base 99 for threaded engagement in said foot. The upstanding lug 108 which forms one end of the U-shaped foot has an arcuate contact edge 109 upon which the circumference of a ferrule terminal of corresponding circumference may seat in the manner indicated in Fig. 15. However, in order to further illustrate the application of the principle of my invention I have shown the ferrule terminal 110 of greater circumference which contacts longitudinally along the two short edges 111 at opposite ends of arcuate seat 109. Under heavy positive clamping pressure the efficient current carrying capacity of the device clearly illustrates that the pressure line contact may be discontinuous if desired.

The clamp hook 112 has a depending leg 113 and a hook 114. The hook is bent arcuately along its free edge 115 so that it may exert its pressure relatively opposite the line pressure contact area or areas. The clamping screw 116 is threadedly passed through horizontal portion 104 of the body 100 and the insulating base is recessed as at 117 to accommodate the end of the screw. The screw 116 and a corresponding screw of the companion fuse clamp (not shown) serve as end stops to accommodate cartridge fuses of the size illustrated.

In Fig. 18 I have shown the body 100 identical with the previously described body, but have shown a substituted hook 118 which is U-shaped, the bottom leg 119, being perforated to pass the screw 116 and extending beyond the screw, serving as an end stop to accommodate a shorter cartridge fuse 120 of the ferrule type. In this illustration the circumference of the terminal may be smaller and a single short pressure line contact is established between the fuse terminal and the seat 109.

From the foregoing, it will be readily understood that inexpensive and exceptionally efficient fuse terminal mountings may be provided to meet the requirements of practically any desired installation of protective fuses of the cartridge type all within the spirit of this invention and within the scope of the ensuing claims.

What is claimed is:

1. A fuse clamp comprising a contact member, means to support a fuse terminal member with respect to the contact member so that an edge only of either of said members seats against a surface of the other of said members, and screw pressure clamping means for binding the seating portions of said members in uniform positive pressure line contact, the remainder of said members being exposed and free of mutual contact.

2. A fuse clamp comprising a contact seat member for an insert fuse terminal member, the contact seat member being fashioned with respect to an inserted fuse terminal to insure said members contacting only by abutment of an edge of one of said members on a surface of the other of said members, clamping means adapted to be hooked over the terminal member and extending downwardly toward said seat member and a pressure screw threaded into said seat member and disposed alongside and between the terminal and the downwardly extending portion of the clamp for exerting positive clamping pressure on said terminal.

3. A terminal clamp of the class described comprising a clamp member comprising a hook for extending over a terminal and a leg extending alongside said terminal, a screw extending downwardly through the clamp hook portion member and between the terminal and said leg whereby pressure of the screw on the clamp exerts binding pressure on the terminal and supports the screw against the inserted terminal to resist bending at a point intermediate the ends of the screw.

4. A terminal clamp comprising a body providing a contact seat for an inserted terminal, means on the body to support the terminal in position on the contact so that an edge only of the terminal contacts said seat, a clamp comprising a hooked portion engaging the edge of the terminal opposite the seating contact and a leg extending downwardly alongside said terminal in spaced relation thereto, and a clamping screw passing through the hooked portion and interposed in the space between said leg and said terminal and threadedly engaged in said body for exerting positive line pressure contact of the terminal on the said seat.

5. In a clamp for blade type terminals the combination of a stamped body of metal of high electrical conductivity, a stamped metal clamp member of high strength material and a screw, the body having a substantially flat contact seat portion and a finger and a lug spaced apart in a plane at right angles to said seat portion for positioning a blade type terminal in edgewise seating position on said contact seat portion, said clamp comprising a hook portion engaging over the non-seating edge of the said blade terminal and a leg depending therefrom in spaced relation to the side of the terminal, said screw passing downwardly through the hook portion of the clamp and between said terminal and said leg and threadedly engaging in the said body for clamping the seating edge of the blade terminal in uniform line pressure contact with the contact seat portion of the said stamped body.

6. A terminal mounting clamp comprising a stamped body of metal of high electrical conductivity comprising a contact seat portion and a positioning means, arranged to dispose a cartridge fuse terminal on the contact seat so that only a portion of one edge of either of the said parts shall contact with a surface of the other, a hook shaped clamp for engagement over the terminal and a screw passing through the clamp and threaded into the said stamped metal body said clamp including a leg depending alongside the screw and contacting at its lower end on said screw closely adjacent the point of entry of the screw into the stamped metal body.

7. A fuse clamp comprising a stamped metal body of high electrical conductivity formed with an upturned arcuate edge portion for seating abutment with a greatly restricted surface area on the circumference of a ferrule type terminal, a clamp arranged for hooked engagement with the terminal in relatively opposed relation to the seating abutment of the terminal, and a screw passing through the clamp and threaded into said body for establishing positive line pressure contact along the said seating abutment.

8. A clamping structure comprising a stamped metal body, a connector lug, said lug and body arranged in superposed relation, the uppermost of said superposed members being of high electrical conductivity and providing a contact seat surface whereon a terminal rests in edgewise abutment, means on the body to support said terminal in said position of greatly restricted mutual contact area and a positive pressure clamp for releasably fixing the terminal in position under uniform line contact pressure.

9. In a fuse clamping structure the combination of a hooked clamp member, a screw passing through said member, said screw shouldered beneath the head thereof whereby the said member is loosely retained for limited movement vertically of the screw and a body member for seating a fuse terminal, said screw threadedly adjustable in said body for releasably clamping an inserted fuse terminal in positive pressure line contact only between the hooked clamp member and said body member.

10. In a fuse clamping means the combination of a stamped body of high strength metal having an upturned slotted end for the reception of a blade type terminal in edgewise relation therein, a lug seating on the said body and adapted to receive said blade type terminal in edgewise seating relation thereon, a clamping hook engaging over the blade type terminal, a clamping screw threaded into said body for effecting line pressure contact only between the surface of said lug and the edge of said terminal, and means securing said body and said lug together.

11. In a fuse clamping means the combination of a member of high electrical conductivity and a screw actuated hooked clamp cooperating means to secure a fuse terminal member thereto for establishing positive pressure line contact only between a narrow edge portion of either of said members and an extended sidewall surface of the other of said members and thereby affording substantially complete surface exposure of both members for ventilation.

12. In combination a body, a screw threaded into said body at the end, and a clamping member comprising a hook for engaging an inserted member to be clamped and an angularly related integral leg, the leg abutting the screw intermediate its ends and exerting pressure against it for exerting shear strain on the screw at a point remote from the hook and relatively close to the said body and for further binding the screw against loosening while under clamping strain.

13. A clamp for blade type terminals comprising a stamped metal body, a hook shaped clamp, and a screw, the body having a flat seat portion and a slotted portion for positioning a blade type terminal with its lower edge only contacting said flat seat portion, the clamp comprising a hook portion for engaging the top edge only of the blade type terminal and a leg depending from the hook in spaced relation to the side of the terminal, the screw passing downwardly through the hook portion and having the leg and the side of the terminal in tangential contact therewith, said screw threadedly adjustable into the body below said tangential contacts.

14. Fuse holding means consisting of a forked guide to position a fuse terminal blade, a base of conducting material related to said guide for effecting a highly restricted edge to surface line contact between said base and an inserted fuse terminal blade, and a screw retained clamp for engaging over the inserted blade and holding it in contact with the said base under pressure.

15. Fuse holding means consisting of a base of conducting material, means to position a ferrule type fuse terminal on the base for restricted edge to surface line contact only between said base and terminal, and a screw retained clamp for holding the fuse terminal in contact with said base under pressure.

16. Fuse holding means consisting of a base of good electricity conducting material, means to so position a fuse terminal on said base that the mutual contact between them is limited to a part of an edge of one on a surface of the other, a hooked clamp for engaging the terminal substantially opposite the contact between the terminal and base and means extending upwardly from the base through the clamp and adapted for exerting positive pressure thereon for holding the fuse terminal in contact with said base under pressure.

17. A clamping structure of the class described comprising a contact member, means to so position an inserted terminal member on said contact member that a portion of an edge of one of said members only abuts with a surface of the other of said members, and positive pressure clamping means for retaining the restricted mutually abutting areas of the said members together under uniform positive pressure, said clamping means and said positioning means arranged for restricted engagement with such an inserted terminal.

18. In a fuse clamping means the combination of a stamped metal body having a flat seat portion intermediate its ends, means at one of said ends arranged and adapted to position an inserted terminal blade with a limited edge portion of the blade contacting said seat portion, and a hooked clamp adjustable toward and away from said seat portion, whereby an inserted and positioned terminal blade is releasably engaged on a relatively opposite edge of such blade and clamped under uniform positive pressure in restricted edge contact only on said seat.

EDWIN W. LANDMEIER.